United States Patent
Hulbert et al.

(10) Patent No.: US 11,232,046 B2
(45) Date of Patent: *Jan. 25, 2022

(54) PORTABLE, COMPUTER-PERIPHERAL APPARATUS INCLUDING A UNIVERSAL SERIAL BUS (USB) CONNECTOR

(71) Applicant: ARKEYTYP IP LIMITED, County Cork (IE)

(72) Inventors: Thomas Steven Hulbert, London (GB); Durrell Grant Bevington Bishop, London (GB)

(73) Assignee: ARKEYTYP IP LIMITED, County Cork (IE)

( * ) Notice: Subject to any disclaimer, the term of this patent is extended or adjusted under 35 U.S.C. 154(b) by 0 days.

This patent is subject to a terminal disclaimer.

(21) Appl. No.: 16/778,413

(22) Filed: Jan. 31, 2020

(65) Prior Publication Data

US 2020/0167295 A1  May 28, 2020

Related U.S. Application Data

(63) Continuation of application No. 15/248,263, filed on Aug. 26, 2016, now Pat. No. 10,585,813, which is a
(Continued)

(30) Foreign Application Priority Data

Jan. 5, 2006 (GB) ........................... 0600207

(51) Int. Cl.
*G06F 13/00* (2006.01)
*G06F 13/10* (2006.01)
(Continued)

(52) U.S. Cl.
CPC .......... *G06F 13/102* (2013.01); *G06F 9/4411* (2013.01); *G06F 9/4415* (2013.01);
(Continued)

(58) Field of Classification Search
CPC .... G06F 13/107; G06F 9/4415; G06F 13/385; G06F 9/4411; G06F 21/34; G07C 9/00007
See application file for complete search history.

(56) References Cited

U.S. PATENT DOCUMENTS 6,512,467 B1 * 1/2003 Hanko ................. G06F 3/0238
341/22
6,917,373 B2 * 7/2005 Vong ..................... G06F 3/0481
715/805
(Continued)

FOREIGN PATENT DOCUMENTS

DE 202004008697 U1 9/2004
GB 2435946 A 9/2007
(Continued)

OTHER PUBLICATIONS

UK Search Report, dated Feb. 13, 2007, issued in priority Application No. GB0700207.4, dated Feb. 13, 2007.
(Continued)

*Primary Examiner* — Jing-Yih Shyu
(74) *Attorney, Agent, or Firm* — Saul Ewing Arnstein & Lehr LLP

(57) ABSTRACT

A portable computer-peripheral apparatus comprises a Universal Serial Bus (USB) connector. The apparatus is operable to communicate with a computer terminal (e.g. a 'PC'). Following connection to the PC, the apparatus initialises (i.e. presents or enumerates itself) as a HID keyboard and then sends to the terminal a first predefined sequence of keycodes automatically without manual interaction; the keycodes complying with the human interface device (HID) keyboard standard protocol. Each keycode represents and simulates a keystroke, such as those performed when a user strikes a key on the PC keyboard. The keycode sequence
(Continued)

automates the direct access to content, and/or or the initiation of a task or other process.

24 Claims, 7 Drawing Sheets

Related U.S. Application Data continuation of application No. 14/657,394, filed on Mar. 13, 2015, now abandoned, which is a continuation of application No. 12/160,002, filed as application No. PCT/GB2007/000004 on Jan. 5, 2007, now Pat. No. 9,009,374.

(51) Int. Cl.
*G06F 21/34* (2013.01)
*G06F 9/4401* (2018.01)
*G06F 13/38* (2006.01)
*G06F 13/42* (2006.01)
*G06F 13/40* (2006.01)
*H04L 29/06* (2006.01)
*G07C 9/20* (2020.01)

(52) U.S. Cl.
CPC .......... *G06F 13/107* (2013.01); *G06F 13/385* (2013.01); *G06F 13/4081* (2013.01); *G06F 13/4282* (2013.01); *G06F 21/34* (2013.01); *H04L 67/42* (2013.01); *G07C 9/20* (2020.01)

(56) References Cited

U.S. PATENT DOCUMENTS

| | | | | |
|---|---|---|---|---|
| 7,090,515 | B2* | 8/2006 | Regen | H01R 13/629 439/131 |
| 7,308,581 | B1* | 12/2007 | Geosimonian | G06F 21/32 713/182 |
| 7,480,941 | B1* | 1/2009 | Balasubramaniam | H04L 63/08 726/24 |
| 7,629,963 | B1* | 12/2009 | Wright | G06F 9/4446 345/156 |
| 2002/0049606 | A1* | 4/2002 | Dan | G06Q 30/02 705/1.1 |
| 2002/0167932 | A1 | 11/2002 | McGowan et al. | |
| 2004/0004598 | A1* | 1/2004 | Muthuswamy | G06F 3/04895 345/156 |
| 2005/0033968 | A1* | 2/2005 | Dupouy | G06F 21/34 713/183 |
| 2005/0055471 | A1* | 3/2005 | Payne | G06F 13/102 710/5 |
| 2005/0103838 | A1* | 5/2005 | Slotkin | G07F 17/26 235/380 |
| 2005/0148279 | A1* | 7/2005 | Maa | A63H 3/28 446/297 |
| 2005/0240692 | A1 | 10/2005 | Li et al. | |
| 2006/0007314 | A1* | 1/2006 | Fong | G08B 21/0208 348/207.99 |
| 2006/0069840 | A1 | 3/2006 | Corbett et al. | |
| 2006/0143326 | A1* | 6/2006 | Hauck | G06F 3/023 710/18 |
| 2006/0161665 | A1* | 7/2006 | Tsai | G06F 21/31 709/229 |
| 2006/0173980 | A1* | 8/2006 | Kobayashi | G06F 8/60 709/222 |
| 2007/0011356 | A1* | 1/2007 | Schauser | H04L 12/1881 709/248 |
| 2008/0016347 | A1* | 1/2008 | Maj | G06F 21/34 713/168 |

FOREIGN PATENT DOCUMENTS

| | | |
|---|---|---|
| JP | 2005284953 A | 10/2005 |
| KR | 20040066396 | 7/2004 |
| KR | 20040069400 | 8/2004 |
| KR | 20060089395 | 8/2006 |
| WO | 0131428 A1 | 5/2001 |
| WO | 2006088681 A2 | 8/2006 |
| WO | 2007007439 A1 | 1/2007 |

OTHER PUBLICATIONS

International Preliminary Report on Patentabililty and Written Opinion, dated Jul. 8, 2008, issued in priority International Applicaton No. PCT/GB2007/000004, dated Jul. 8, 2008.
"File history of coresponding European Application No. EP 07700311".
"International SEarch Report issued in priority International Application No. PCT/GB2007/00004".
"UK Examination Report, dated Apr. 21, 2008, issued in priority Application No. GB0700207.4", dated Apr. 21, 2008.
Anonymous , "Cumana QFS User Handbook", downloaded form the Internet on Aug. 20, 2013, http://acorn.chriswhy.co.uk/docs/Cumana/Cumana_QFSManual.pdf, 1984.
Anonymous , "NCC series controllers. Mark 1 Issue No. history", downloaded from the Internet on Sep. 3, 2013, http://www.4qd.co.uk/service/ncc/hist.html.
Anonymous , "Pro-120 series controllers", downloaded form the Internet on Sep. 3, 2013, http://www.4qd.co.uk/serv/prohist.html.
Anonymous, "TM8100 mobiles TM8200 mobiles SErvice Manual", downloaded from the Internet on Sep. 3, 2013, http://www.repeater-builder.com/tait/pdf/tait-tm8100-tm8200-service-manual.pdf, Nov. 2007.

* cited by examiner

PORTABLE, COMPUTER-PERIPHERAL APPARATUS INCLUDING A UNIVERSAL SERIAL BUS (USB) CONNECTOR

CROSS-REFERENCE TO RELATED APPLICATIONS

This is a continuation of U.S. application Ser. No. 15/248,263, filed on Aug. 26, 2016 now U.S. Pat. No. 10,585,813, issued Mar. 10, 2020, which is a continuation of U.S. application Ser. No. 14/657,394, filed Mar. 13, 2015, abandoned, which is a continuation of U.S. application Ser. No. 12/160,002, filed on Dec. 3, 2008, now U.S. Pat. No. 9,009,374, issued Apr. 14, 2015, which claims priority to International Application No. PCT/GB2007/00004, filed on Jan. 5, 2007, which claims priority to GB Application No. GB0600207, filed Jan. 5, 2006, the entire contents of each of which is fully incorporated hereby by reference.

BACKGROUND OF THE INVENTION

1. Field of the Invention

This invention relates to a portable, computer-peripheral apparatus comprising a Universal Serial Bus (USB) connector. The apparatus enables automated access to content, or automated initiation of a task or other process.

USB is a serial bus standard; devices connecting using the USB standard must have a physical connector that conforms to the standard: there are currently many applicable plug designs (e.g. Series A, Series B, Mini A, Mini B); the USB standard also evolves to cover new plug designs.

2. Description of the Prior Art

There are many and varied tasks that can be initiated and content that can be accessed using a personal computer, either locally or remotely via a network. Current options for accessing these tasks or content are typically performed by the user navigating through or interacting with the PC operating system (OS) or a software application using generic input apparatus such as a keyboard and mouse. These navigations and interactions can be complex and lengthy, making them hard to remember; and they are often an abstract set of user actions that have no direct representational relationship to the task or content.

The typical options for accessing tasks or content on a PC using the Graphical User Interface (GUI) of the OS, as described above, present several problems to the user; certain tasks are hard to remember, non-descriptive and non-portable. The user faces increased difficulty when using a PC he is not familiar with, such as a friend's computer or one set up for multiple users, such as a computer in a public place, for example an airport. Further, a non-computer-literate user (for example a child, an old person, or a technophobe) cannot be expected to manage complex interactions to get to a task, such as navigating to a URL, but may be quite happy to interact once they are there—they understand the value in the task, not the complicated process to get to it. An example of the problem stated above is:

A user is unable to access their web-mail easily, particularly a new subscriber, because they have to remember a long sequence of actions, such as the correct website URL, their username and password. A typical set of tasks for this function is too complex to be readily remembered by a user—for example:

Select a text based menu item from a set of drop-down menus within the OS to start a browser application;

Then type in a URL address in the form of a text string;

Navigate to the login page;

Enter a username and password.

A secondary problem that has been identified is that most interactive peripheral hardware such as application-specific input devices usually requires a second step after physically connecting to a computer, such as installing a driver or software. So in cases where application-specific input devices have been created, they are often complicated to set up and are not very portable—being unable to operate with computers that do not have the required drivers or software.

Existing solutions that relate to the problems outlined above are:

Compact Disks (CD) with autorun files (for example, a CD business card) that automatically launches an application or setup wizard on the CD "Hotkeys", such as those found on certain 'Logitech' USB keyboards or other PC peripherals, that can perform a series of tasks or actions from a single key press.

Programmable Keyboard-Macro devices that can be user-programmed with key sequences for example, PI Engineering's X-Keys range of products (refer to U.S. Pat. No. 4,964,075).

USB mass storage devices with specific files or software preinstalled, (such software needing to be manually selected and run by an operator) offering physical and portable access to predefined, or user-defined content. It is also possible to include an 'autorun' file on a USB drive: a user typically plugs a USB drive into a PC and the USB automatically generates data that emulates the operation of a CD. But it is possible to block this kind of CD emulation at the operating system level (and for security reasons, e.g. reducing the risk of viral infection, blocking could become increasingly common).

SUMMARY OF THE INVENTION

A first aspect of the invention is a portable computer-peripheral apparatus comprising a Universal Serial Bus (USB) connector, the apparatus being operable to communicate with a computer terminal (which we shall refer to generically as a 'PC') such that, following connection to the PC, the apparatus initialises (i.e. enumerates or presents itself) as a HID keyboard and then sends to the terminal a first predefined sequence of keycodes automatically without manual interaction; the keycodes complying with the human interface device (HID) keyboard standard protocol. Each keycode represents and simulates a keystroke, such as those performed when a user strikes a key on a PC keyboard. The keycode sequence automates the direct access to content, and/or the initiation of a task or other process.

The apparatus brings three important benefits to the user:

1. The user has a physically descriptive object that represents the given task or process that is initiated or implemented by the HID keycodes.

2. The user no longer needs to remember or learn the complex actions that need to be performed in order to navigate to and run the content or carry out the task/process—he simply connects the apparatus to the PC.

3. The user can initiate or access the task/process from any personal computer terminal running common Operating System software, since the apparatus does not require unique software or drivers.

4. Because HID keyboard emulation is used, there is no risk of the operating system blocking operation, as may happen with conventional USB devices that emulate CDs.

The terminal could be, as noted above, a conventional PC (i.e. personal computer, including Apple Macintosh computer) but also a personal digital assistant (PDA), laptop computer, gaming console, portable gaming device, mobile telephone, smartphone, communicator, wireless information device, web browsing device, portable navigation device and indeed any other kind of electronic information terminal.

Other aspects include the following:

A portable USB compliant apparatus adapted to operate as a web-mail key that, when plugged into a computer terminal, sends HID keyboard or CD emulation data to open a browser running on the terminal to enable web-mail on a remote server to be accessed.

A portable USB compliant apparatus adapted to operate as a toy that, when plugged into a computer terminal, sends HID keyboard or CD emulation data to open a browser running on the terminal and/or to enable web-based story data associated with the toy to be accessed.

A portable USB compliant apparatus adapted to operate as a music download key that, when plugged into a computer terminal, sends HID keyboard or CD emulation data to open a media player application running on the terminal and/or to cause that application to initiate or request the streaming of a specific track, or a set of tracks to the terminal.

A portable USB compliant apparatus adapted to operate as a business card from an individual that, when plugged into a computer terminal, sends HID keyboard or CD emulation data to open an email application running on the terminal and/or to open a new e-mail message that is automatically completed with recipient data, stored on the apparatus, corresponding to the individual.

A portable USB compliant apparatus adapted to operate as a drawing tool that, when plugged into a computer terminal, sends HID keyboard or CD emulation data to open a paint or drawing application running on the terminal.

A portable USB compliant apparatus adapted to operate as a key to a retailer's web site that, when plugged into a computer terminal, sends HID keyboard or CD emulation data to open a browser running on the terminal and/or to automatically open that web site.

DETAILED DESCRIPTION

Figure 1:
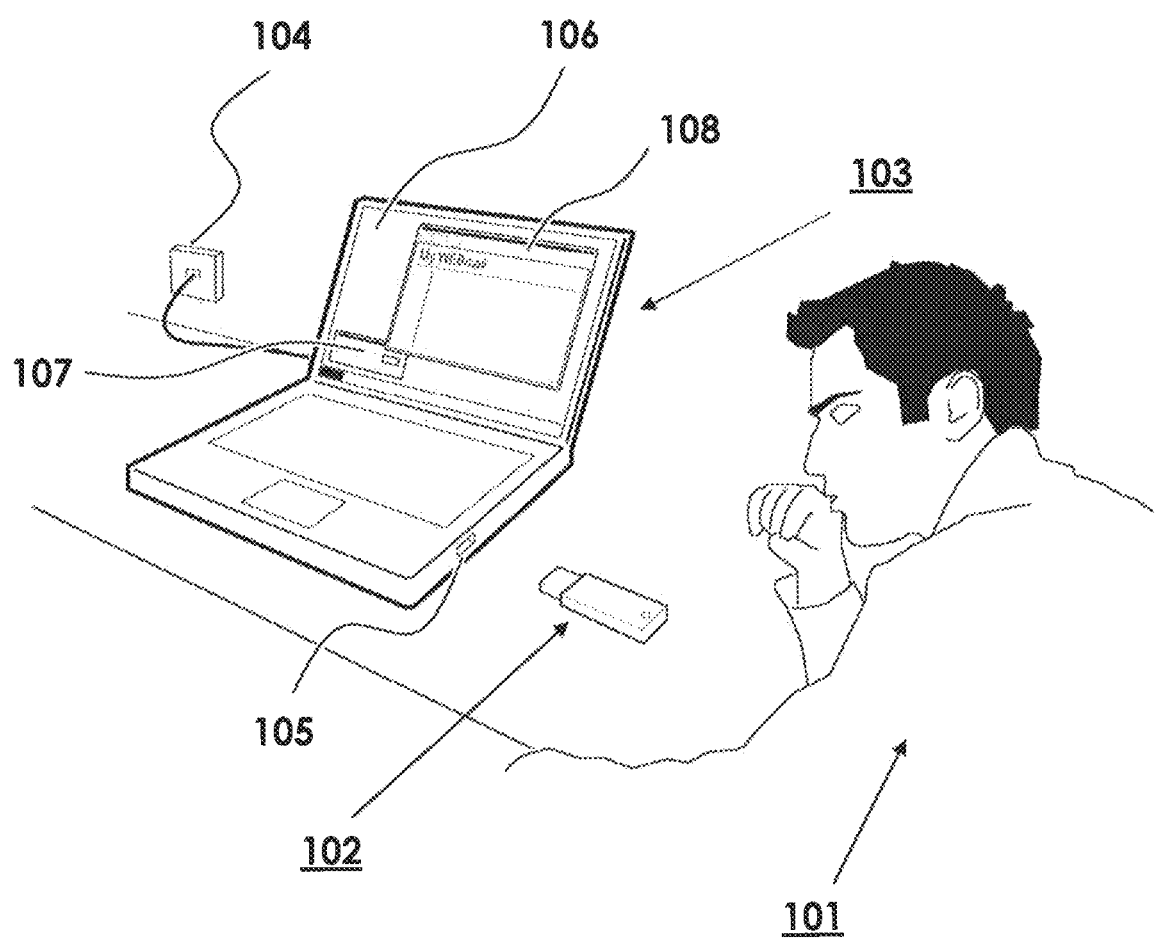
FIG. 1 is an example of an embodiment of the invention for the application as a USB web-mail key.

The apparatus initiates/accesses a task or content by automatically performing a pre-programmed action whenever the user connects the apparatus to the PC. Alternatively, the apparatus can perform the action by limited interaction with the user—requiring a two-step sequence. In this alternative embodiment, the user connects the apparatus to a PC, thus initiating a pre-programmed sequence of actions; and later presses a button on the apparatus to initiate a separate pre-programmed or alternatively user-programmed sequence.

In either event, the apparatus emulates a HID keyboard device and sends keycodes complying with the HID protocol to the PC. The Universal Serial Bus (USB) human interface device (HID) is a device class definition of USB devices. This device class consists of human interface devices such as computer keyboards, computer mice, game controllers, and alphanumeric display devices. The USB HID protocol is defined in a number of documents provided by the USB Implementers Forum (USB-IF) Device Working Group. The primary document used to describe the USB HID class is the Device Class Definition for HID 1.11, entitled "Universal Serial Bus (USB) Device Class Definition for Human Interface Devices (HID) Firmware Specification—Jun. 27, 2001 Version 1.1.11".

The task or content is either accessed locally on the PC (for example, open a new email window using the PC's default email application) or accessed remotely over a network (for example, stream an audio file over the internet from a remote server, via a unique reference or URL).

In the preferred embodiment, the pre-programmed sequence of actions initiating a task or accessing content is made up of a series of simulated user-keyboard events or keystrokes. These are sent as HID protocol compliant keycodes in a sequence from the apparatus to the PC. The action either inputs directly to the PC's operating system (for example, to open a URL using internet explorer) and/or controls a separate software application (for example, opening and initiating playback of a network audio file from within windows media player) or performs data-entry functions (for example, entering a text string into a field on a form).

In a preferred embodiment, when the apparatus is connected to a PC it 'initialises', (e.g. emulates, simulates, presents itself or enumerates) as a standard 'plug and play' HID keyboard. After starting up correctly and establishing a connection, the apparatus sends a timed sequence of keycodes, simulating a specific sequence of (normally user-generated) keystrokes used to access the given task or content by a method determined by the operating system or application. The sequence of keycodes is acted upon by the PC operating system (or application) and the task is thus initiated or content accessed.

In a preferred embodiment, the method determined by the operating system would be a Command Line Interface built into the Operating System (OS) and into which commands can be entered in the form of text (that is, a sequence of typed characters) or a similar standard feature of the OS that enables direct access to programs, files, network paths and internet URLs via text based commands. On the Windows operating system, the Windows Run box is an example of this type of interface and is accessed by a sequence of keystrokes comprising Winkey+R. Therefore, in a preferred embodiment, the initial sequence of keycodes sent by the apparatus would be those for 'Winkey' and 'R' key; this initial sequence being followed by a subsequent sequence of keycodes that would be entered into the Run box and which would initiate the task or access the content.

The method determined by the application would differ and would be dependent on the application but would also comprise a sequence of keycodes. The sequence of keycodes would be recognised by the application, which would perform the associated task or process.

In some embodiments the apparatus initialises to simulate more than one USB interface, for example, both as a human input device profile (HID) keyboard and a HID mouse. In these cases the keyboard interface is used to access the task or content; after which a combination of the keyboard interface profile and additional interface profiles will be used to control or interact with the task or content. For example, an 'etch-a-sketch' style drawing game/toy transmits keycodes, causing the operating system (OS) to open a drawing application such as Microsoft Paint; subsequently mouse events are transmitted from the apparatus, causing drawing actions within the application.

Thus the apparatus takes advantage of inbuilt components of commonly used operating systems, such components effectively comprising pre-installed driver applications with limited functionality. Because certain profiles such as the HID profiles mentioned above conform to agreed standards for communication, the apparatus, by communicating with a PC only according to the agreed standard, functions properly on a wide range of available PCs, even when the PCs have different operating system software such as MacOS or Windows.

Some examples of additional USB interfaces that use such standard system drivers are: pointer, mouse, joystick, gamepad, keyboard (HID); Audio; Mass Storage.

As an enhancement in some embodiments a basic form of bi-directional communication may be achieved as follows: When the apparatus initialises as a HID keyboard, the user strikes a 'modifier' or locking key such as NUMLOCK and/or CAPSLOCK and/or SCROLLLOCK and/or KANALOCK on their PC keyboard. When these keys are pressed, data is sent from the PC to the keyboard indicating the state of these keys; this data is typically used to turn on/off LEDs on the keyboard. This data is normally sent to all keyboards connected to the PC; therefore if a user hits one such key on their PC keyboard, data is typically sent to the apparatus also. The data thus received from the PC causes the apparatus to perform an action. For example, the user presses NUMLOCK on their PC keyboard and a superhero toy connected to the PC initiates an animated sequence (the body parts of the toy start to move).

Software can also generate Locking Key events (i.e. software can simulate the pressing of a Locking Key). Therefore software can communicate to the apparatus using this method, without any user interaction needed. For example, a java applet in a web page could communicate with a superhero toy connected to the PC, initiating an animated sequence (the body parts of the toy start to move).

The apparatus connects to the PC using the Universal Serial Bus (USB) connection and protocol. USB is currently the most appropriate connection and communication system for the apparatus since it is commonly available, normally physically accessible and because it requires no user set-up when simulating a 'plug and play' HID device. The USB port is a familiar, common and easy-to-use connection point to which HID devices can be connected without the need of driver installation. Alternatively, the apparatus can connect using a wireless protocol such as Bluetooth or Zigbee but these methods currently impose certain limitations on the portability of the system because of the security inherent in these systems.

In a wireless embodiment, the apparatus includes both a USB connection and a wireless connection; the apparatus is first connected physically to the PC by the USB connection, initiating transmission of a sequence of keycodes that performs a 'pairing' operation between the apparatus and the PC; thus providing clearance for subsequent automatic wireless communication between the apparatus and the particular PC. Upon such subsequent wireless communication, the apparatus performs in a similar way to the embodiments described having physical connections. For example, by transmitting via the commonly available Bluetooth HID profile (instead of the USB HID profile) in order to simulate keystrokes by transmitting keycodes.

The apparatus may have various physical configurations depending on the application required.

For example, the 'key' apparatus automatically accessing web-mail (described previously) preferably takes the form of a single USB key-fob style apparatus, having text and/or graphics printed on the outside that refer to the web-mail provider and possibly the user. This 'key' apparatus is plugged directly into the USB port of a PC, initiating a sequence of simulated keystrokes that automatically access the user's personal web-mail page for example.

To provide an example of an alternative configuration, a toy apparatus comprises two parts—a base (or dock) part that is connected to the PC, for example via a cable; and a separate part, such as an action figure, that may be removed from and plugs into the base part.

The apparatus may also include other input or output devices such as sensors or electro-mechanical actuators, responding for example to USB communications from the PC and/or other environmental stimuli.

For example, in a further alternative embodiment, a toy embodiment uses electric motors or electro-magnetic actuators to move body parts of an action figure. The web-based application normally controls the toy (using either bi-directional commands described above, or possibly audio output from speakers associated with the PC) such that movements of the actuators are initiated in response to, or synchronise with, changing on-screen content on the PC.

In a further alternative embodiment, a 'key' style device accesses a web-hosted catalogue, and includes a barcode-scanning head so that when barcodes in a printed catalogue are swiped, additional information is displayed within a corresponding internet page on the store's web site.

The present invention may be applied to many alternative configurations, and used in many varied applications, some examples include:

1. A web-mail key. Plug it into a computer and it takes you directly to your web-mail inbox.

2. A superhero toy. Plug it into a computer and it takes you to (and perhaps interacts with) the next episode of a web-based comic story.

3. A music flyer. Plug it into a computer and it takes you to Windows Media Player and starts to stream a specific track, or set of tracks.

4. An "email me" business card. Plug it into a computer, press a button on the card and it takes you directly to your email application with a new message window pre-filled in with the desired address (on the business card).

5. An "etch-a-sketch" toy. Plug it into a computer and it starts a drawing application, such as Microsoft Paint, opens a new blank image and centres the cursor—the user can then draw using a simple interface on the apparatus (in this example the apparatus initialises as both a HID keyboard and a HID mouse).

6. A web-catalogue key. Plug it into a computer and it takes you to the store's website.

A scenario of use is described below, representing one such embodiment in more detail: The example embodiment is described with reference to the figures.

Description—Example Embodiment (USB Web-Mail Key)

FIG. 1

User 101 has newly subscribed to an internet email service, which can be accessed through an internet browser application, enabling him to view and send email messages from any personal computer with an internet connection.

A web-mail access apparatus 102 comprises a USB-compatible processor component; a USB connector; and external graphical elements (not shown) referring to the web-mail account and the web-mail service in general.

Personal Computer (PC) 103 has an internet connection 104; a USB port 105 and an Operating System (OS), incorporating software (e.g. USB HID profile) capable of receiving and processing keycodes (simulating key-strokes) from an external device (without requiring additional drivers); and Graphical User Interface (GUI) 106.

Upon user 101 connecting web-mail access apparatus 102 to the USB port 105 of PC 103, the apparatus powers up and begins an initialisation process. On initialisation apparatus 102 enumerates as a HID keyboard interface and is recognised as such by the Operating System.

After the apparatus has been successfully initialised the apparatus transmits (in a timed sequence) an initial series of keycodes to the Operating System. Each keycode represents and simulates a keystroke, such as those performed when a user strikes a key on the PC keyboard. The initial series of keycodes sent by the apparatus 102 to the PC 103 are interpreted by the Operating System as a sequence of keystrokes that launch software application 107. (In this example, the software application 107 is a standard feature of the Operating System that enables direct access to programs, files, network paths and internet URLs—for example, Windows Run). In response to this keystroke sequence the Operating System launches the application.

After a programmed time period, (allowing time for the application to fully open) the apparatus 102 sends a second series of timed keycodes to the PC 103. This second series of keycodes is interpreted by the Operating System as a sequence of keystrokes that represent data entry to the application 107 in the form of a text string URL (Universal Resource Locator). In this example the URL represents the website of the internet email service subscribed to by user 101. In the preferred embodiment, the URL includes a command for automated user login (for example, a query string including username and password that will be processed by a script running on the server). The last keycode sent from the apparatus 102 to PC 103 is interpreted by the OS as a confirmation and execution command, and is sent to the application 107 (for example, the ENTER key). The first and/or second set of keycodes (or any other set) can include unique data—e.g data identifying or authenticating a user and/or the apparatus 102.

Application 107 then opens the URL using the Operating System's default internet browser 108; the browser in turn displays the internet page of the web-mail service subscribed to by user 101. After initiating access to the URL, application 107 automatically closes (for illustration purposes the application is shown open in FIG. 1.)

In an alternative embodiment, where a higher level of security is desired, the URL entered into application 107 may not include a full command for automated login, but instead only a part of the login, such as the username. In this case, the web page reached by the URL is a login page for user 101, with only a password entry being required. The password may then be entered by the user in the traditional method using the keyboard or may be entered by apparatus 102 as an automated series of keycodes representing the password string; upon the user pressing a button on apparatus 102, once.

In the example embodiment of FIG. 1, the user 101 has previously subscribed to a web-mail service. Apparatus 102 has been pre-programmed (for example at the store where the subscription was purchased) with the user's unique identifier information and thus represents his personal access to his web-mail. The web service is graphically represented on the case of the apparatus 102. The user thus becomes accustomed to thinking of his web-mail access as apparatus 102 and carries the apparatus with him; using it as a universal 'key' to access his email on any compatible internet-connected computer, simply and easily.

Since most Operating Systems include the necessary functionality (such as the HID software) allowing the application such as 107 to initiate web-mail access, the user can gain almost universal access, from a very wide range of computer terminals.

So, in use, user 101 connects web-mail access apparatus 102 to the USB port of an internet connected PC, such as 103. The apparatus then automatically sends a series of keycodes to the PC that control the Operating System 106 as previously described. This results in the default internet browser launching and automatically opening the internet page of the user's web-mail service.

Technical and functional details of the web-mail key example embodiment are described below with reference to the figures.

Example Embodiment—Detailed Description (USB Web-Mail Key)

FIG. 2

Figure 2:
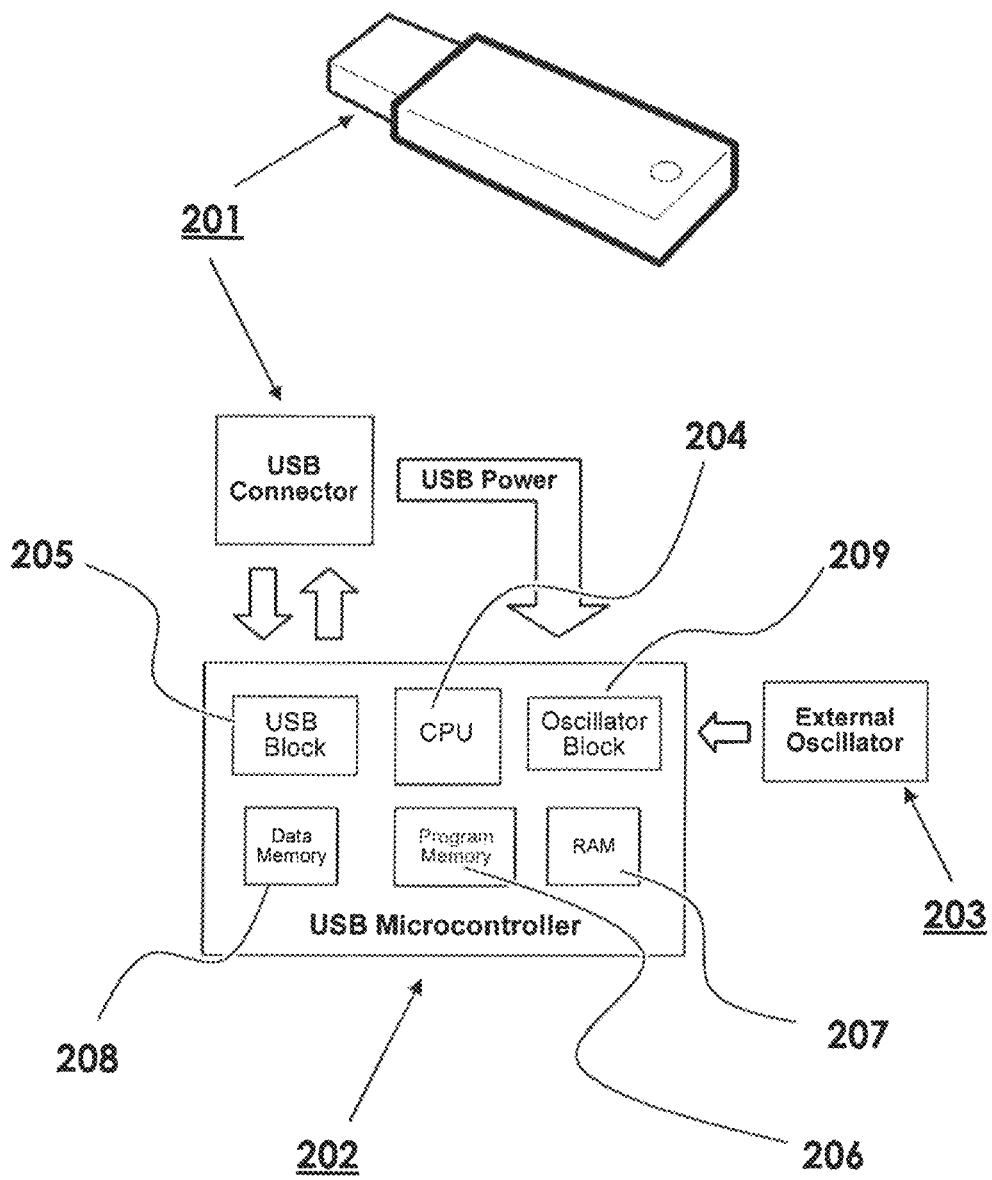
FIG. 2 is a block diagram showing the functional components of apparatus 102 of FIG. 1 in more detail.

FIG. 2 is a block diagram showing the functional components of apparatus 102 in more detail.

Apparatus 102 comprises a USB connector 201; a USB-compatible microcontroller 202 and an external oscillator 203. USB microcontroller 202 comprises a CPU 204; a USB interface block 205; program memory 206; RAM 207; data memory 208; and an oscillator block 209.

USB microcontroller 202 is programmed with firmware (application code and USB descriptors) that enables apparatus 102 to enumerate as a HID keyboard interface when connected to a PC.

When apparatus 102 is connected to the USB port of a PC, USB microcontroller 202 powers up and begins to run firmware stored in program memory 206.

After successfully enumerating as a HID keyboard, the microcontroller accesses data stored in data memory 208; the data having been pre-programmed and representing the action to be performed (in this example, control the OS to open the user's web-mail internet page using the default internet browser). The data read from memory is an instruction set that enables the microcontroller to perform the action.

The USB microcontroller 202 then performs the action by interpreting the instruction set and sending a series of paced USB data packets (or reports) to the PC via USB interface block 205; each packet of data sent representing a keycode (or combination of keycodes). This series of keycodes simulates a specific sequence of keystrokes that control the Operating System to carry out the action (in this example, resulting in the default internet browser of the PC automatically launching and opening the internet page of the user's web-mail service).

FIG. 3

Figure 3:
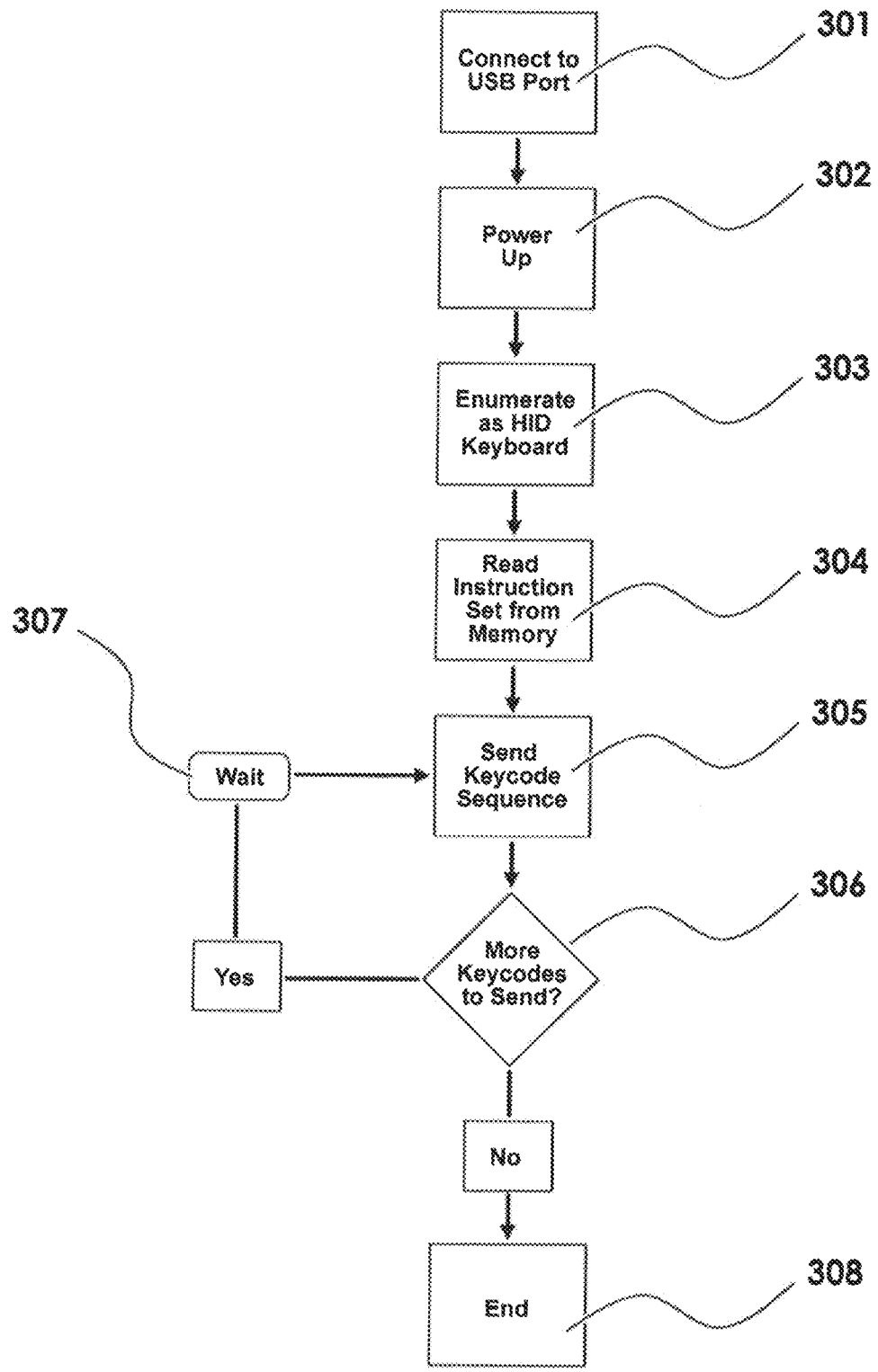
FIG. 3 is a flow diagram showing the general sequence of events that occurs when apparatus 102 of FIG. 1 is connected to a PC so that a pre-programmed action is performed.

FIG. 3 is a flow diagram showing the general sequence of events that occurs when apparatus 102 is connected to a PC so that a pre-programmed action is performed.

301—Apparatus 102 is connected to the USB port of a PC
   302—Apparatus powers up
   303—Apparatus communicates with the PC and enumerates as a HID keyboard
   304—Instruction set is read from memory
   305—First keycode sequence is sent to PC
   306—Check instruction set for next keycode sequence
   307—Wait for a period; then send second keycode sequence
   308—End

FIG. 4

Figure 4:
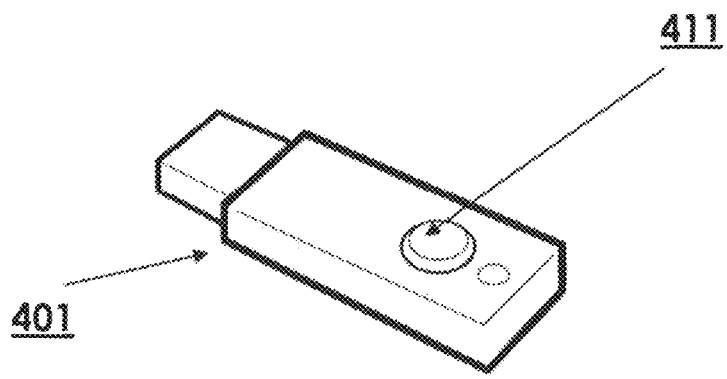
FIG. 4 shows an embodiment of the apparatus of the invention.

FIG. 4 shows an alternative embodiment 401 of the apparatus, having a button, 411 used to initiate a second sequence of operations.

FIG. 5

Figure 5:
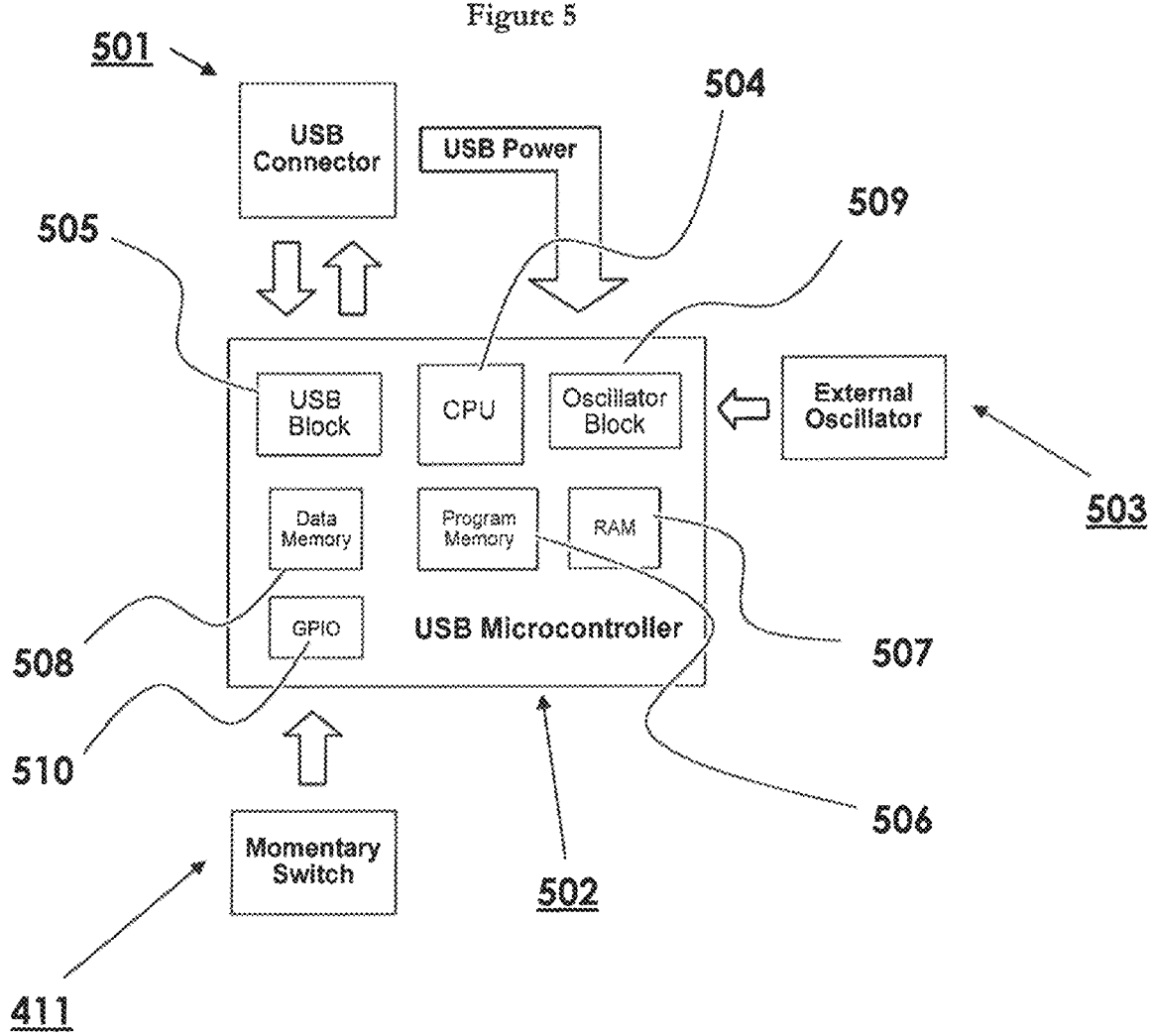
FIG. 5 is a block diagram showing the functional components of the apparatus 401 of FIG. 4.

FIG. 5 is a block diagram showing the functional components of an apparatus 501.

The apparatus comprises a USB connector; a USB-compatible microcontroller 502; an external oscillator 503; and a momentary push switch 411. USB microcontroller 502 may comprise a CPU 504; a USB interface block 505; program memory 506; RAM 507; data memory 508; an oscillator block 509; and a general purpose input/output port (GPIO) 510.

USB microcontroller 502 is programmed with firmware (application code and USB descriptors) that enables the apparatus to enumerate as a HID keyboard interface when connected to a PC, and subsequently to transmit keycodes in timed sequences.

When the apparatus is connected to the USB port of a PC, USB microcontroller 502 powers up and begins to run firmware stored in program memory 506.

After successfully enumerating as a HID keyboard, the microcontroller accesses data stored in data memory 508; the data having been pre-programmed and representing the action to be performed (in this example, control the OS to open the user's web-mail internet page using the PC's default internet browser). The data read from memory is an instruction set that enables the microcontroller to perform the action.

The USB microcontroller 502 then performs part of the action by interpreting the instruction set and sending a series of paced USB data packets (or reports) to the PC via USB interface block 505; each packet of data sent representing a keycode (or combination of keycodes). This series of keycodes simulates a specific sequence of keystrokes that control the Operating System to carry out part of the action (in this example, resulting in the default internet browser of the PC automatically launching and opening the login page of the user's web-mail service). The microcontroller then waits for the user to press switch 511. When the switch is pressed a second series of keycodes are sent to the PC and the remaining part of the action is performed (in this example, the password is entered into the login page of the user's web-mail service).

FIG. 6

Figure 6:
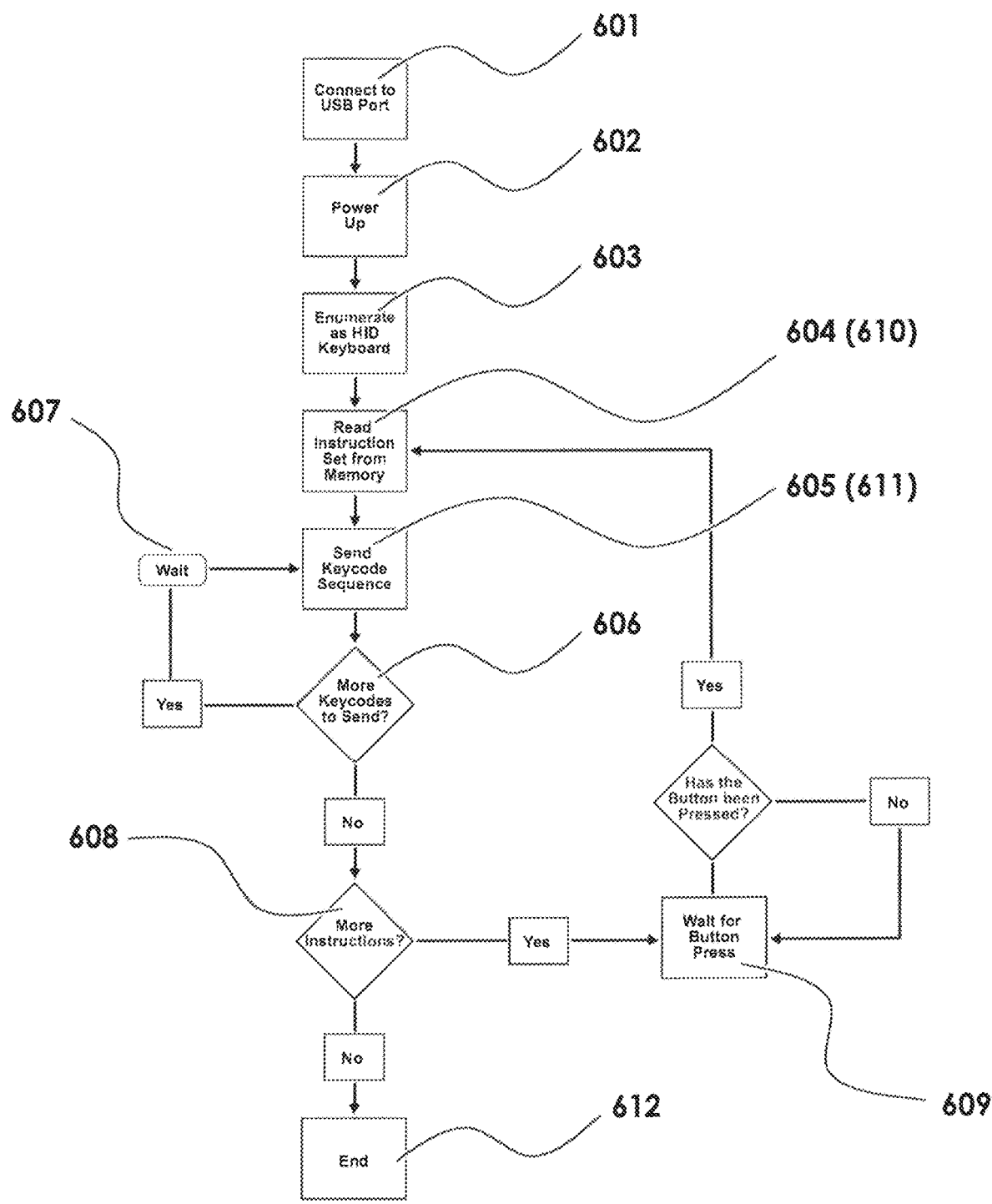
FIG. 6 is a flow diagram showing the general sequence of events that occurs when apparatus 401 of FIG. 4 is connected to a PC.

FIG. 6 is a flow diagram showing the general sequence of events that occurs when apparatus 401 (including a button) is connected to a PC so that a set of pre-programmed actions is performed, followed by a user-initiated second sequence of pre-programmed actions.

601—Apparatus is connected to the USB port of a PC
   602—Apparatus powers up
   603—Apparatus enumerates as a HID keyboard
   604—First instruction set is read from memory
   605—First keycode sequence is sent to PC
   606—Check instruction set for next keycode sequence
   607—Wait for a period; then send next keycode sequence
   608—Check for next instruction
   609—Wait for button press
   610—Next instruction set is read from memory
   611—Send next keycode sequence
   612—End Examples of Variants Selected alternative embodiments of the present invention are briefly described below. The example embodiments are described with reference to the figures.

FIG. 7

Figure 7:
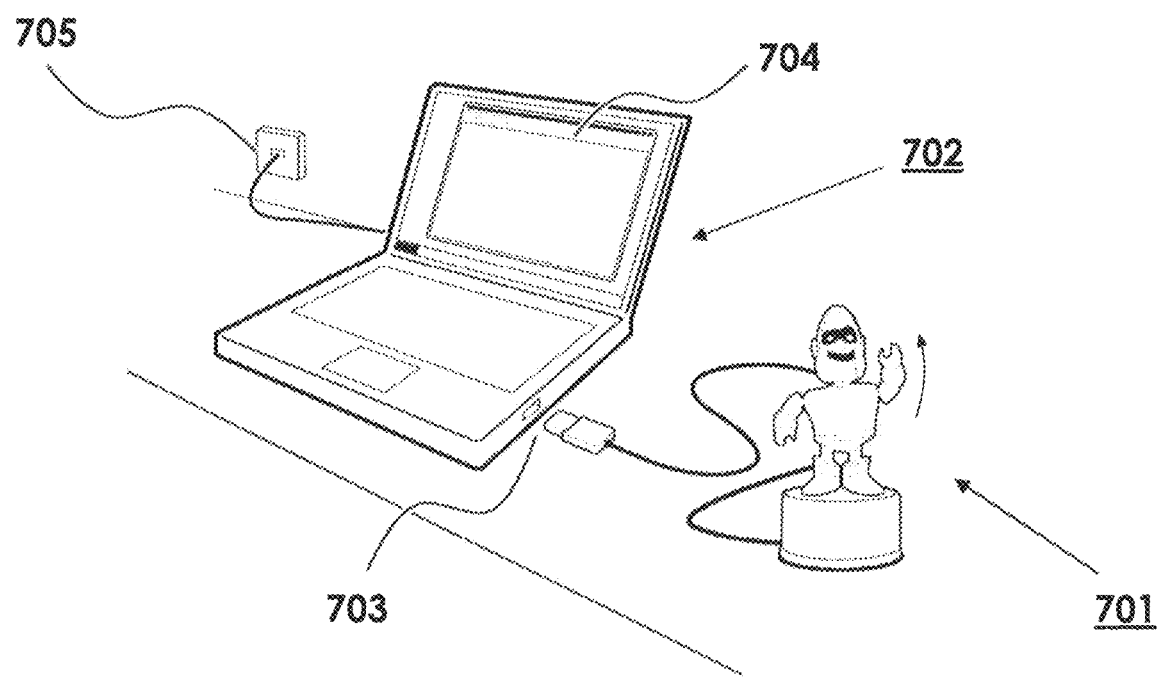
FIG. 7 shows a toy which, when connected to a computer, opens an internet page containing the next episode of a web comic story.

FIG. 7 shows a 'superhero' toy which, when connected to a computer, opens an internet page containing the next episode of a web comic story.

Toy 701 comprises a USB processor component; and a USB connector and cable. Toy 701 may also incorporate sensors and electro-mechanical actuators; for example a solenoid-controlled mechanism to open and close the mouth of the toy, in response to signals either a) from a microphone sensor included in the toy, or b) from signals from the PC, for example representing 'modifier' keycode (such as 'Caps Lock' or 'Num-Lock').

Personal Computer (PC) 702 has an internet connection 705; a USB port 703; and an Operating System (OS) and Graphical User Interface (GUI).

When a user connects apparatus 701 to the USB port 703 of PC 702, the apparatus powers up and initialises. On initialisation, apparatus 701 enumerates as a HID keyboard interface and is recognised by the Operating System.

After the apparatus has been successfully initialised the apparatus sends an initial series of paced keycodes to the Operating System. Each keycode represents a keystroke, such as are sent when a user strikes a key on the PC keyboard. The initial series of keycodes sent by the apparatus 701 to the PC 702 is interpreted by the Operating System as a sequence of keystrokes that universally launch a system software application. (In this example, the software application is a standard feature of the Operating System that enables direct access to programs, files, network paths and internet URLs—for example, Windows Run). In response to this keystroke sequence the Operating System launches the application.

After a programmed time period, the apparatus 701 sends a second series of paced keycodes to the PC. This second series of keycodes are interpreted by the Operating System as a sequence of keystrokes that represent data entry to the system application in the form of a text string URL (Universal Resource Locator). The URL represents the internet page of the web comic story. In the preferred embodiment, the URL includes a user ID (for example, a query string including a user ID number that will be processed by a server side script). Passing a user ID to the remote server enables content to be unique to the user and/or different content to be accessed incrementally (for example, episode 1 of the story is shown when the apparatus is first connected; episode 2 on the second connection and so on).

The last keycode sent from the apparatus 701 to the PC is interpreted by the OS as a confirmation and execution command for the system application (for example, ENTER key). The system application then opens the URL using the Operating System's default internet browser 704; the browser in turn displays the internet page of the web comic story.

So, in use, a user connects superhero toy 701 to the USB port of an internet-connected PC 702. The apparatus then automatically sends a series of keycodes to the PC that control the Operating System as previously described. This results in the default internet browser 704 launching and automatically opening an internet page containing the next episode of a web comic story.

Various enhancements to this example embodiment may be achieved by the addition of simple sensors and electro-mechanical actuators to the toy. For example, as the web comic story plays within the internet browser, the body parts of toy 701 may be animated by electro-magnets or miniature motors. The story on screen and the toy may then appear to interact with each other (for example, a character on the PC screen and the superhero toy 701 may move in unison); or the toy may appear to be enhanced by the multimedia capabilities of the PC (for example, audio from the PC, in the form of dialog in the superhero's voice, may be synchronised with the automated mouth movements of toy 701). Adding simple sensors to toy 701, to detect push and rotation for example, may enable control of the content within internet browser 704 by means of manual mechanical interactions with toy 701.

A further enhancement is USB communication back from the PC 702 to the toy 701. This enables content within the internet browser to send commands to toy 701 and thus control the toy's movements in response to specific timed events within the content (for example, a character within the story on-screen may ask a question and the toy may reply—the mouth movements of the toy being synchronised with the audio).

It is desirable to maintain USB communication within a 'driverless' protocol. So for example, in the case of an interactive toy such as Toy 701, an additional USB interface (again using only standard system drivers) allows communication from the PC to the Toy 701, enabling signals (that can be interpreted by the processor of Toy 701) for control of the Toy 701 to be sent. Signals thus pass from the application, via the PC to the toy. For example, a generic HID interface or USB Audio interface may be used.

A significant advantage of the invention applied to Toys is that the normal input devices such as a keyboard and mouse may be covered, disabled or removed entirely by unplugging from the PC for the duration of the interaction; thus ensuring that children playing with the PC by use of the Toy cannot access or damage other data held on the PC.

FIG. 8

Figure 8:
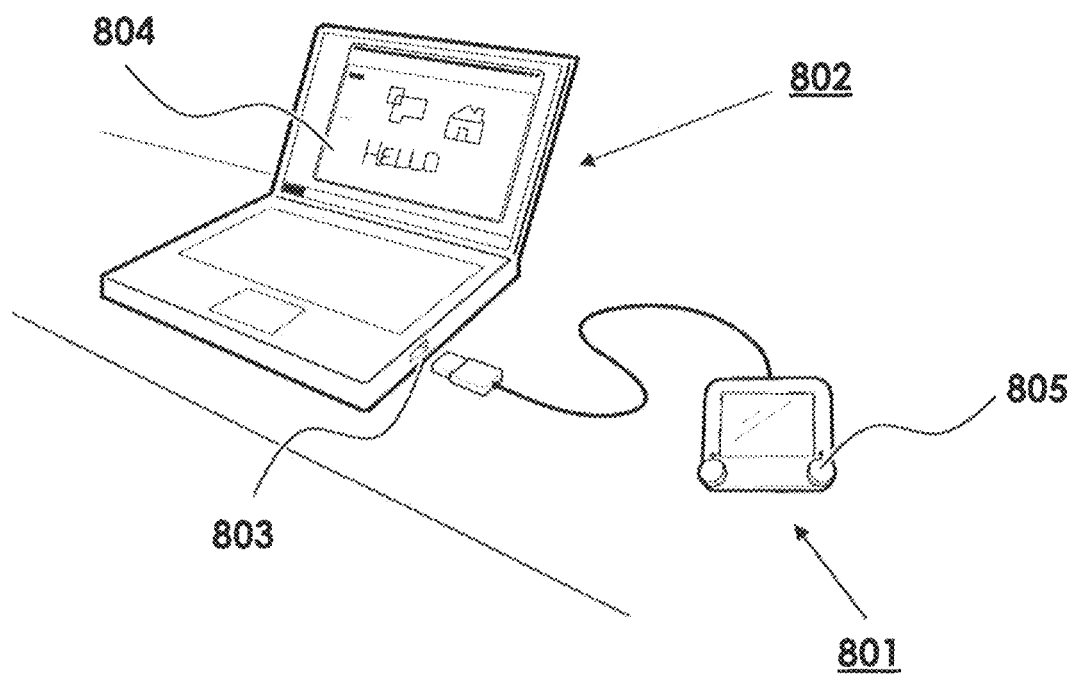
FIG. 8 shows an "etch-a-sketch" style toy which, when connected to a computer, opens a standard drawing application and enables the user to create drawings using a simple interface on the toy.

FIG. 8 shows an "etch-a-sketch" style toy which, when connected to a computer, opens a standard drawing application and enables the user to create drawings using a simple interface on the toy.

Toy 801 comprises a USB processor component; a USB connector and cable; and a simple user interface 805. User interface 805 may for example comprise two rotary knobs and two push buttons.

Personal Computer (PC) 802 has a USB port 803; and an Operating System (OS) and Graphical User Interface (GUI).

When a user connects apparatus 801 to the USB port 803 of PC 802, the apparatus powers up and initialises. On initialisation, apparatus 801 enumerates as both a HID keyboard interface and a HID mouse interface and is recognised by the Operating System.

After the apparatus has been successfully initialised the apparatus sends an initial series of paced keycodes to the Operating System. Each keycode represents a keystroke, such as are sent when a user strikes a key on the PC keyboard. The initial series of keycodes sent by the apparatus 801 to the PC 802 are interpreted by the Operating System as a sequence of keystrokes that universally launch a system software application. (In this example, the software application is a standard feature of the Operating System that enables direct access to programs, files, network paths and internet URLs—for example, Windows Run). In response to this keystroke sequence the Operating System launches the application.

After a programmed time period, the apparatus 801 sends a second series of paced keycodes to the PC 802. This second series of keycodes are interpreted by the Operating System as a sequence of keystrokes that represent data entry to the system application in the form of a text string. The text string represents the name of a standard drawing application, such as Microsoft Paint.

The last keycode sent from the apparatus 801 to the PC 802 is interpreted by the OS as a confirmation and execution command for the system application (for example, ENTER key). The system application then opens the drawing application 804.

After the drawing application 804 has been opened, the user can use interface 805 to control the movement of the cursor within the drawing application on the PC screen and thus create drawings using the toy as a new input apparatus. When the interface is acted upon, data is sent from apparatus 801 to the PC representing mouse X, Y and button events (for example, turning a left rotary knob may cause data representing a mouse button press and cursor movements from left to right to be sent to the PC, resulting in a horizontal line being drawn within the drawing application).

Interface 805 may also be used to initiate other actions with the drawing application by sending keystroke sequences to the PC (for example, pressing a left button may cause a series of keycodes to be sent to the PC, resulting in the canvas being cleared).

So, in use, a user connects toy 801 to the USB port of an internet connected PC 802. The apparatus then automatically sends a series of keycodes to the PC that control the Operating System as previously described. This results in a standard drawing application, such as Microsoft Paint, automatically launching. The user can then create drawings using interface 805 on the toy.

Figure 9:
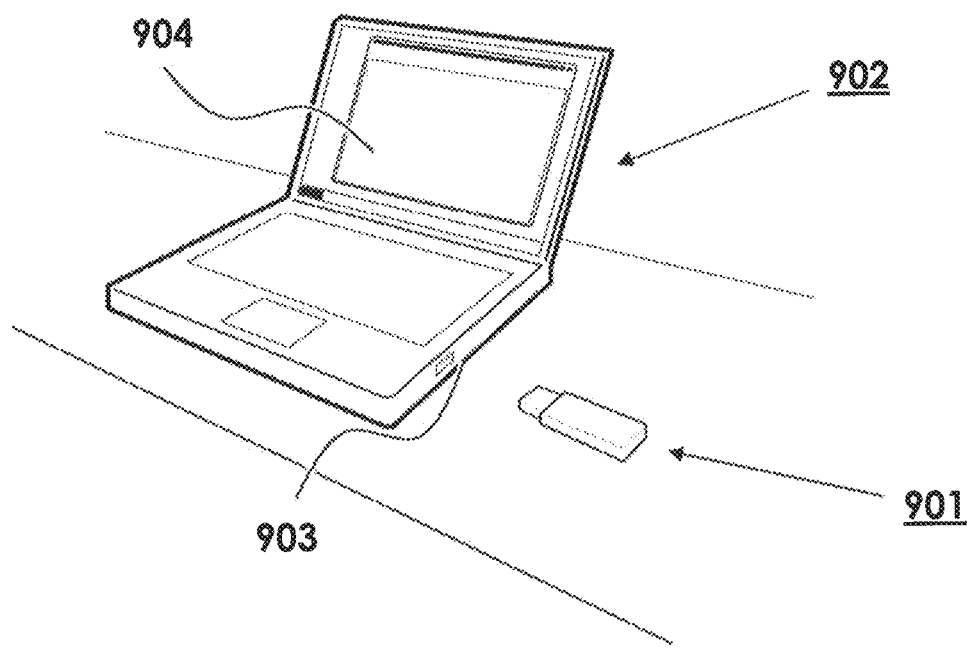
FIG. 9 shows a USB storage apparatus which, when connected to a computer, automatically opens a file stored within memory held on the apparatus itself.

It can be appreciated from the above examples that there is significant value in the intuitive nature of the interaction, particularly for certain sections of the market such as children. The apparatus is either marked in such a way as to become associated visually with the action or actions it performs, for example by printed graphics and/or text; or is directly shaped into a configuration that is representative of the interaction, for example the 'etch-a-sketch' or 'super-hero' configurations. In some cases, a proprietary shape may be used under license, such as a Disney® character (or characters), in both the apparatus and the content on the PC. FIG. 9

FIG. 9 shows a USB storage apparatus which, when connected to a computer, automatically opens a file stored within memory held on the apparatus itself. The file may be an application or any other type of file recognised by the operating system.

Apparatus 901 comprises a USB processor component; a mass storage component; and a USB connector.

Personal Computer (PC) 902 has a USB port 903; and an Operating System (OS) and Graphical User Interface (GUI).

When a user connects apparatus 901 to the USB port 903 of PC 902, the apparatus powers up and initialises. On initialisation, apparatus 901 enumerates as both a HID keyboard interface and a Mass Storage interface and is recognised by the Operating System.

After the apparatus has been successfully initialised the apparatus sends an initial series of paced keycodes to the Operating System. Each keycode represents a keystroke, such as are sent when a user strikes a key on the PC keyboard. The initial series of keycodes sent by the apparatus 901 to the PC 902 are interpreted by the Operating System as a sequence of keystrokes that universally launch a system software application. (In this example, the software application is a standard feature of the Operating System that enables direct access to programs, files, network paths and internet URLs—for example, Windows Run). In response to this keystroke sequence the Operating System launches the application.

After a programmed time period, the apparatus 901 sends a second series of paced keycodes to the PC 902. This second series of keycodes are interpreted by the Operating System as a sequence of keystrokes that represent data entry to the system application in the form of a text string. The text string represents the file-path of the file stored on the mass storage component of the apparatus 901.

The last keycode sent from the apparatus 901 to the PC 902 is interpreted by the OS as a confirmation and execution command for the system application (for example, ENTER key). The system application then opens or runs the file and displays the result 904.

The invention claimed is:

1. A system including a server and a portable computer-peripheral apparatus comprising a Universal Serial Bus (USB) connector, the portable computer-peripheral apparatus being able to communicate with a computer terminal such that, following connection to the computer terminal, the portable computer-peripheral apparatus initialises or presents itself as a human interface device (HID) keyboard and then sends to the computer terminal a first predefined sequence of key codes automatically without manual interaction; the first predefined sequence of key codes including keycodes complying with the HID keyboard standard protocol, wherein the first predefined sequence of key codes includes a Uniform Resource Locator (URL), Unique Identifiers, such as a username and a password, wherein the portable computer-peripheral apparatus enables the computer terminal to communicate with the server that is associated with the URL, and wherein the server is configured to receive the Unique Identifiers from the computer terminal, and wherein the server is configured to process the Unique Identifiers using a server side script executable on the server, to provide customized content corresponding to the Unique Identifiers.

2. The system as claimed in claim 1, in which the first predefined sequence of key codes automates direct access to content, or initiation of a task or other process.

3. The system as claimed in claim 1, wherein a second sequence of key codes is transmitted in addition to the first predefined sequence of key codes, following a mechanical interaction with the portable computer-peripheral apparatus.

4. The system as claimed in claim 1, wherein a second sequence of key codes is transmitted in addition to the first predefined sequence of key codes, following a mechanical interaction with the computer terminal's user-interface.

5. The system as claimed in claim 1, the portable computer-peripheral apparatus including in addition means of communicating with the computer terminal wirelessly, wherein the first predefined sequence of key codes causes the computer terminal to accept subsequent wireless communication from the portable computer-peripheral apparatus without further manual interaction.

6. The system as claimed in claim 1, wherein the first predefined sequence of key codes causes the computer terminal to access data at the server.

7. The system as claimed in claim 6 wherein the server holds personal data such as email information.

8. The system as claimed in claim 1, in which the first predefined sequence of keycodes include unique data identifying a user or the portable computer-peripheral apparatus.

9. The system as claimed in claim 6, wherein the server holds content that changes from time-to-time.

10. The system as claimed in claim 1, wherein the portable computer-peripheral apparatus is in the form of a toy and includes an additional manually operated input.

11. The system as claimed in claim 1, wherein the portable computer-peripheral apparatus is in the form of a toy and includes a sensor.

12. The system as claimed in claim 1, wherein the portable computer-peripheral apparatus includes mechanical actuators that move in response to signals from the computer terminal.

13. The system as claimed in claim 1, the portable computer-peripheral apparatus holding additional data files, wherein the first predefined sequence of key codes causes the computer terminal to access said additional data files.

14. The system as claimed in claim 1, wherein the portable computer-peripheral apparatus includes a visual representation associated with actions caused by the first predefined sequence of key codes.

15. The system as claimed in claim 1, wherein the portable computer-peripheral apparatus is a portable USB compliant apparatus able to operate as a web-mail key that, when plugged into a computer terminal, sends HID keyboard or CD emulation data to open a browser running on the computer terminal to enable web-mail on the server to be accessed.

16. The system as claimed in claim 1, wherein the portable computer-peripheral apparatus is a portable USB compliant apparatus able to operate as a toy that, when plugged into a computer terminal, sends HID keyboard or CD emulation data to open a browser running on the computer terminal or to enable web-based story data associated with the toy to be accessed on the server.

17. The system as claimed in claim 1, wherein the portable computer-peripheral apparatus is a portable USB compliant apparatus able to operate as a music download key that, when plugged into a computer terminal, sends HID keyboard or CD emulation data to open a media player application running on the computer terminal or to cause that application to initiate or request streaming of a specific track, or a set of tracks to the computer terminal, from the server.

18. The system as claimed in claim 1, wherein the portable computer-peripheral apparatus is a portable USB compliant apparatus able to operate as a business card from an individual that, when plugged into a computer terminal, sends HID keyboard or CD emulation data to open an email application running on the computer terminal or to open a new e-mail message that is automatically completed with recipient data, stored on the portable computer-peripheral apparatus, corresponding to the individual.

19. The system as claimed in claim 1, wherein the portable computer-peripheral apparatus is a portable USB compliant apparatus able to operate as a drawing tool that, when plugged into a computer terminal, sends HID keyboard or CD emulation data to open a paint or drawing application running on the computer terminal.

20. The system as claimed in claim 1, wherein the portable computer-peripheral apparatus is a portable USB compliant apparatus able to operate as a key to a retailer's web site that, when plugged into a computer terminal, sends HID keyboard or CD emulation data to open a browser running on the computer terminal or to automatically open that web site located at the server.

21. The system as claimed in claim 1, in which the username is a user ID.

22. The system as claimed in claim 1, in which the first predefined sequence of key codes include unique data authenticating a user or the portable computer-peripheral apparatus.

23. Method of communication between a portable computer-peripheral apparatus comprising a Universal Serial Bus (USB) connector, and a server, the method comprising the steps of:
(i) the portable computer-peripheral apparatus comprising a Universal Serial Bus (USB) connector, following connection to a computer terminal, initialising or presenting itself as a human interface device (HID) keyboard;
(i1) the portable computer-peripheral apparatus then sending to the computer terminal a first predefined sequence of key codes automatically without manual interaction; the first predefined sequence of key codes including keycodes complying with the human interface device (HID) keyboard standard protocol, wherein the first predefined sequence of key codes includes a Uniform Resource Locator (URL), Unique Identifiers, such as a username and a password,
(iii) the server, which is associated with the URL, receiving the Unique Identifiers username and the password from the computer terminal, and
(iv) the server processing the Unique Identifiers using a server side script executing on the server, to provide customized content corresponding to the Unique Identifiers.

24. A server, configured to communicate with a portable computer-peripheral apparatus comprising a Universal Serial Bus (USB) connector, the portable computer-peripheral apparatus being able to communicate with a computer terminal such that, following connection to the computer terminal, the portable computer-peripheral apparatus initialises or presents itself as a human interface device (HID) keyboard and then sends to the computer terminal a first predefined sequence of key codes automatically without manual interaction; the first predefined sequence of key codes including key codes complying with the HID keyboard standard protocol, wherein the first predefined sequence of key codes includes a Uniform Resource Locator (URL), Unique Identifiers, such as a username and a password, wherein the server is associated with the URL, and is configured to receive the Unique Identifiers from the computer terminal, and wherein the server is configured to process the Unique Identifiers using a server side script executable on the server, to provide customized content corresponding to the Unique Identifiers.

* * * * *